(12) United States Patent
Suau et al.

(10) Patent No.: US 10,106,692 B2
(45) Date of Patent: Oct. 23, 2018

(54) THICKENING AGENT FOR AQUEOUS SYSTEMS, FORMULATIONS CONTAINING SAME AND USE THEREOF

(71) Applicant: COATEX, Genay (FR)

(72) Inventors: Jean-Marc Suau, Lucenay (FR); Yves Matter, Quincieux (FR); Denis Ruhlmann, Genay (FR)

(73) Assignee: COATEX, Genay (FR)

( * ) Notice: Subject to any disclaimer, the term of this patent is extended or adjusted under 35 U.S.C. 154(b) by 0 days.

(21) Appl. No.: 15/318,127

(22) PCT Filed: Aug. 3, 2015

(86) PCT No.: PCT/FR2015/052140
§ 371 (c)(1),
(2) Date: Dec. 12, 2016

(87) PCT Pub. No.: WO2016/066910
PCT Pub. Date: May 6, 2016

(65) Prior Publication Data
US 2017/0101544 A1  Apr. 13, 2017

(30) Foreign Application Priority Data
Aug. 5, 2014 (FR) .................................... 14 57600

(51) Int. Cl.
| | | |
|---|---|---|
| *C09D 7/43* | (2018.01) | |
| *C09D 175/04* | (2006.01) | |
| *C08G 18/48* | (2006.01) | |
| *C08G 18/28* | (2006.01) | |
| *C08G 18/67* | (2006.01) | |
| *C08G 18/75* | (2006.01) | |
| *C08G 18/66* | (2006.01) | |
| *C09D 7/00* | (2018.01) | |
| *C09D 11/00* | (2014.01) | |
| *C09D 7/12* | (2006.01) | |
| *A61K 8/87* | (2006.01) | |
| *C08L 75/04* | (2006.01) | |
| *C11D 7/22* | (2006.01) | |

(52) U.S. Cl.
CPC ............ *C09D 7/43* (2018.01); *C08G 18/4833* (2013.01); *C08G 18/676* (2013.01); *C08G 18/755* (2013.01); *C09D 7/002* (2013.01)

(58) Field of Classification Search
None
See application file for complete search history.

(56) References Cited

U.S. PATENT DOCUMENTS

| | | | | |
|---|---|---|---|---|
| 3,558,505 A | * | 1/1971 | Mlot-Fijalkowski | ........................ G01N 21/91 252/408.1 |
| 3,635,891 A | * | 1/1972 | Lubowitz et al. | ...... C08C 19/30 525/111 |
| 3,718,712 A | * | 2/1973 | Tushaus | ............. C08G 18/2825 525/458 |
| 9,732,071 B2 | * | 8/2017 | Patron | .................. A61K 9/0014 |
| 2007/0043205 A1 | * | 2/2007 | Dias | ....................... C08F 283/00 528/373 |
| 2007/0087023 A1 | * | 4/2007 | Ismail | .................... A01N 59/16 424/405 |
| 2007/0098806 A1 | * | 5/2007 | Ismail | .................... A61K 9/145 424/489 |
| 2011/0223125 A1 | * | 9/2011 | Hough | ................. A61K 8/8152 424/70.12 |
| 2011/0243873 A1 | * | 10/2011 | Hough | .................... A61K 8/91 424/70.16 |
| 2014/0301966 A1 | | 10/2014 | Hough et al. | |

FOREIGN PATENT DOCUMENTS

EP   1 477 511 A1   11/2004

\* cited by examiner

*Primary Examiner* — Peter A Salamon
(74) *Attorney, Agent, or Firm* — Oblon, McClelland, Maier & Neustadt, L.L.P.

(57) ABSTRACT

The present invention relates to novel associative thickeners belonging to the category of the HEURs (Hydrophobically modified Ethoxylated URethanes) comprising an associative compound of bicycloheptane type for thickening aqueous compositions, and also to formulations compositions comprising such thickeners and to the final compositions, for example paint, lacquer, varnish or paper coating color formulations.

10 Claims, No Drawings

THICKENING AGENT FOR AQUEOUS SYSTEMS, FORMULATIONS CONTAINING SAME AND USE THEREOF

The present invention relates to novel associative thickeners belonging to the category of the HEURs (Hydrophobically modified Ethoxylated URethanes). These products comprise an associative compound of bicycloheptene type. The present invention also relates to intermediate formulations comprising such thickeners and to the final compositions, for example paint compositions.

Paints consist of fillers, pigments and at least one organic polymer known as binder. In addition to the fillers, the pigments and the binder, a paint composition also comprises a solvent (which is water in the case of aqueous-phase paints), additives for the rheology, additives for the stability (storage, formation of the film, UV) and other additives for obtaining special properties. The behaviour and the properties of the paints depend on the nature of the constituents, in particular of the binder, fillers, pigments and also rheological additives. They generally comprise one or more thickeners, the role of which is to control the rheology of the compositions, both at the stage of their manufacture and during their transportation, their storage or during their implementation. Given the diversity of the constraints practised at each of these stages, it is advantageous for the formulator to have available a range of thickeners exhibiting different rheological behaviours in composition.

The following are distinguished among all the thickeners for paints:
- natural cellulose-based thickeners, also known as cellulose ethers, of HEC type or of HMHEC (Hydrophobically Modified HEC) type,
- acrylic thickeners of non-associative type, known as ASE (Alkali Swellable Emulsions) and those of associative type, known as HASEs (Hydrophobically modified Alkali Swellable Emulsions), and
- associative thickening polyurethanes of HEUR (Hydrophobically modified Ethoxylated URethane) type.

The HASE thickeners can, for example, be obtained by polymerization in the presence of an anionic surface-active agent, of a (meth)acrylic acid monomer, of an alkyl (meth)acrylate monomer and of a hydrophobe monomer consisting of a long aliphatic chain.

The thickening polyurethanes or HEURs, for their part, result from the condensation between a compound of poly(alkylene glycol) type, a polyisocyanate and a reactant which confers the associativity of alkyl, aryl or arylalkyl type consisting of a hydrophobic end group.

Although the HASE and HEUR thickeners belong to the category of associative thickeners, the thickening mechanism cannot be regarded as completely identical. This is because the mechanism of thickening of the aqueous formulation in the presence of an HASE is due to the presence of the hydrophobic groups, which are liable to assemble together in the form of micellar aggregates, but also to the formation of a gel which results from ionic interactions between the carboxyl function groups carried by the backbone of the polymer and the water molecules of the aqueous solvent (JCT Research, Vol. 2, No. 6, April 2005—W. Wu and G. D. Shay—Tailoring HASE Rheology Through Polymer Design: Effects of Hydrophobe Size, Acid Content, and Molecular Weight). In contrast to the HASE thickeners, the HEUR thickeners are non-ionic compounds and their thickening mechanism is not dependent on ionic interactions in the medium (Polymers as Rheology Modifiers—Chap. 12: Systems Approach to Rheology Control—pp. 207-221—ACS Symposium Series 462, 1991).

Thus, the rheological behaviours of the HEUR and HASE thickeners can vary considerably, whereas the functional hydrophobic groups are identical.

The behaviours of the different thickeners on the market can be summarized in the following way:

| Thickener | Associative thickening | Non-associative thickening | Typical molecular weight |
|---|---|---|---|
| HEUR | Yes | Negligible | <50 000 g/mol |
| ASE | No | Yes | 100 000- |
| HASE | Yes | Yes | 1 000 000 g/mol |
| HEC | No | Yes | 3000- |
| HMHEC | Yes | Yes | 100 000 g/mol |

Coatex is the source of numerous research studies on paint thickeners. Furthermore, Coatex markets the products of the Coapur® range, for example the Coapur® XS products, which are non-ionic polyurethane thickeners providing rheological profiles which vary between the newtonian type (low viscosity at low shear gradient) and/or the pseudoplastic type (high viscosity at low shear gradient). Such non-ionic products exhibit the advantage of developing a thickening power which is less dependent on the pH of the formulation than the thickeners of HASE type.

The document WO 02/102868 (Coatex), for example, relates to thickening polyurethanes of polymer comprising ethylene oxide chains type which comprise, at the chain ends, hydrophobic groups comprising several aromatic rings, in particular distyrylphenyl and tristyrylphenyl. Such thickeners make it possible to obtain a high viscosity at low shear gradient and a good pigmentary compatibility, whatever the type of paint (matt or satin).

The document WO 2006/048539 (Coatex) describes thickeners of HASE type exhibiting a hydrophobic group of alkyl type which can comprise up to 32 carbon atoms or of aromatic type which can comprise more than 50 carbon atoms which make it possible to obtain a good dynamic behaviour (high viscosity at a high shear gradient) and a good static behaviour (high viscosity at a low shear gradient).

The inventors have developed a novel thickening polyurethane which makes it possible to very notably increase the viscosity at a high shear gradient and to thus confer, on the aqueous composition which contains it, a good dynamic behaviour, that is to say a high viscosity at a high shear gradient, while maintaining a very good pigmentary compatibility. This thickener can be classified in the category of the thickeners of newtonian or ICI builder type.

This novel thickener can, for example, be used alone in an aqueous paint composition where it is necessary to have a high viscosity at a high shear gradient (for example a satin or gloss paint comprising a high latex content).

It can also be used in combination with a thickener of pseudoplastic type. Such a combination thus makes it possible to obtain an aqueous composition exhibiting a good dynamic behaviour related to the presence of the newtonian thickener and a good static behaviour related to the presence of the thickener of pseudoplastic type.

Such a thickener can be formulated in the aqueous phase and, as a result of its specific structure, it makes possible thickening of the final aqueous composition without requiring specific equipment or high shear energy.

This novel thickener exhibits, at the chain ends, hydrophobic groups of bicycloheptenyl type which are optionally polyalkoxylated.

The document WO 2011/100071 describes rheology-modifying polymers for aqueous systems, in particular shampoo or shower gel formulations. The thickeners described, of acrylic thickener type, can comprise in particular ethyl acrylate (EA), methacrylic acid (MAA) and monomer units comprising a bicycloheptyl-polyether or bicycloheptenyl-polyether group. Such acrylic polymers exhibit a different rheological profile to that of the thickeners of the present invention: namely, they come within the category of acrylic thickeners of pseudoplastic type (high viscosity at low shear gradient).

Definitions

In the description of the present invention, the term "HEUR" is an acronym for "Hydrophobically modified Ethoxylated URethane".

In the description of the present invention, unless otherwise indicated, the percentages expressed represent percentages by weight and are expressed with respect to the total weight of the reference element. For example, when it is indicated that a polymer comprises 10% of a monomer or of a reactant, it is understood that the polymer comprises 10% by weight of this monomer or reactant, with respect to the total weight of this polymer.

In the description of the present invention, the expression "at least one" denotes one or more compounds (for example one or more bicycloheptenyl compounds, one or more polyols, one or more polyisocyanates), such as a mixture of 2 to 5 compounds.

"Alkyl" is understood to mean a linear or branched $C_xH_{2x+1}$ group, where x varies from 1 to 30, preferably from 10 to 30, indeed even from 12 to 28.

"Formulation" is understood to mean the intermediate thickening entity comprising the polyurethane agent according to the invention, formulated in order to be easier to use in the final composition to be thickened. For example, the thickening agent according to the invention can be formulated in the presence of water and of surfactants, in order to be more easily flowable/pourable and easier to incorporate in the composition to be thickened at ambient temperature. The viscosity of the formulation, before its incorporation in the final aqueous composition, is, for example, less than 10 000 mPa·s at 25° C. and at 100 revolutions per minute.

"Composition" is understood to mean the final entity, thickened or to be thickened, comprising the polyurethane agent according to the invention, optionally formulated in the presence, for example, of water and of surface-active agents, and also all of its constituents, the list of which depends on the final application. For example, the final composition comprises mineral pigments and binders, if a paint composition is involved.

DETAILED DESCRIPTION OF THE INVENTION

The polyurethanes of the present invention are thickeners for aqueous compositions, for example aqueous paint compositions. They make it possible to obtain high viscosities at a high shear gradient and to thus confer, on the compositions, a good dynamic behaviour. These thickening polyurethanes can be categorized in the category of thickeners of newtonian or ICI builder type.

Some paint compositions, for example satin or gloss paints, which comprise little in the way of pigments (in comparison with a matt paint, for example) and a great deal of latex, have to exhibit the highest possible viscosity at a high shear gradient. It is called Cone Plan viscosity or ICI viscosity, denoted $\mu_I$ (mPa·s). The thickening polyurethane of the present invention is entirely suited to aqueous compositions of this type.

The thickening polyurethane of the present invention can also be used in combination with a thickener of pseudoplastic type. Such a combination thus makes it possible to obtain a composition exhibiting a good dynamic behaviour related to the presence of the newtonian thickener and a good static behaviour related to the presence of the thickener of pseudoplastic type.

This novel thickener exhibits, at the chain ends, hydrophobic groups of bicycloheptenyl type which are optionally polyalkoxylated.

HEUR Thickener

A subject-matter of the present invention is a thickening belonging to the category of the HEURs (Hydrophobically modified Ethoxylated URethanes). It concerns a non-ionic associative thickening polymer of aqueous compositions.

The thickening polyurethanes or HEURs of the present invention result from the reaction between a reactant which confers the associativity and which consists of an end hydrophobic group, a compound of polyol (for example poly(alkylene glycol)) type and a polyisocyanate. In the context of the present invention, the terms "reaction", "condensation" and "polycondensation" are used equivalently.

More specifically, it concerns a polyurethane resulting from the condensation:

a) of at least one bicycloheptenyl compound, which is optionally polyalkoxylated, of formula (I):

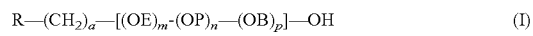

R—(CH$_2$)$_a$—[(OE)$_m$-(OP)$_n$—(OB)$_p$]—OH   (I)

in which:

R represents a bicycloheptenyl radical, optionally substituted by one or more identical or different alkyl groups, comprising between 1 and 20 carbon atoms, a is equal to 0, 1 or 2,

[(OE)$_m$-(OP)$_n$—(OB)$_p$] represents a polyalkoxyl chain consisting of alkoxyl units, distributed in blocks, alternating or random, chosen from ethoxyl OE units, propoxyl OP units and butoxyl OB units, and m, n and p represent, independently of one another, 0 or a number varying between 1 and 250 (limits included), the sum of m, n and p being between 0 and 250, b) of at least one polyol, for example of at least one poly(alkylene glycol), and c) of at least one polyisocyanate.

It is these novel polyurethanes which make it possible, for example, to thicken a paint composition at a high shear gradient (measurement of the ICI viscosity, for example).

The polyurethane according to the present invention comprises, as constituent a), a compound of formula (I). Such a compound is known, in the context of the present invention, as "bicycloheptenyl compound". The compounds of formula (I) can comprise a polyalkoxyl chain, itself consisting of at least two alkoxyl units. Alternatively, the compounds of formula (I) do not comprise a polyalkoxyl chain.

Furthermore, the polyurethane comprises, as constituent b), a polyol which can be a poly(alkylene glycol).

"Poly(alkylene glycol)" is understood to mean a polymer of an alkylene glycol derived from an olefin oxide. The poly(alkylene glycol)s chains of the constituent b) according to the present invention include a proportion of ethyleneoxy groups, a proportion of propyleneoxy groups and/or of a portion of butyleneoxy groups. The poly(alkylene glycol)s chains according to the present invention can, for example, comprise a dominant proportion of ethyleneoxy groups in combination with a secondary proportion of propyleneoxy groups. Specific examples of alkylene glycol polymers comprise: poly(alkylene glycol)s having an average molecular weight of 1000, 4000, 6000 and 10 000 g/mol, and polyethylene-polypropylene glycols having a percentage of ethylene oxides of between 20 and 80% by weight and a percentage of propylene oxides of between 20 and 80% by weight.

According to one aspect of the present invention, the polyurethanes result from the condensation in particular of a poly(alkylene glycol) which is poly(ethylene glycol). It can, for example, be a poly(ethylene glycol), the molecular weight of which varies between 2000 g/mol and 20 000 g/mol, for example between 8000 g/mol and 15 000 g/mol (limits included). Mention may be made, by way of example, of poly(ethylene glycol) (or PEG) with a molecular weight of 10 000 g/mol and 12 000 g/mol (limits included).

According to another aspect of the present invention, the polyurethanes result from the condensation of several poly(alkylene glycol)s, for example of several poly(ethylene glycol)s.

Furthermore, the polyurethane comprises, as constituent c), at least one polyisocyanate.

"Polyisocyanate" is understood to mean a compound which comprises at least two isocyanate —N═C═O functional groups.

According to one aspect of the present invention, the polyurethanes result from the condensation in particular of a polyisocyanate which is chosen from the group consisting of toluene diisocyanate, toluene diisocyanate dimers, toluene diisocyanate trimers, 1,4-butane diisocyanate, 1,6-hexane diisocyanate, isophorone diisocyanate, 1,3-cyclohexane diisocyanate, 1,4-cyclohexane diisocyanate, 4,4'-diisocyanatodicyclohexylmethane, 1-methyl-2,4-diisocyanatocyclohexane, diphenylmethylene diisocyanate (MDI), for example 2,2'-MDI, 2,4'-MDI, 4,4'-MDI, polymeric MDI or their mixtures, dibenzyl diisocyanate, a mixture of 1-methyl-2,4-diisocyanatocyclohexane and 1-methyl-2,6-diisocyanatocyclohexane, hexamethylene diisocyanate biuret, hexamethylene diisocyanate biuret dimers, hexamethylene diisocyanate biuret trimers, 2,2,4-trimethylhexamethylene diisocyanate and a mixture of at least two of these compounds.

According to one embodiment of the present invention, the bicycloheptenyl compound of formula (I) does not comprise a polyalkoxyl chain. Thus, in this case, the values m, n and p are equal to 0.

According to another embodiment of the present invention, the bicycloheptenyl compound of formula (I) comprises a polyalkoxyl chain.

According to one example of this embodiment, in the formula (I) below:

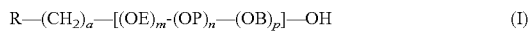

m represents a number being between 1 and 250 (other than 0) and
n and p represent, independently of one another, 0 or a number being between 1 and 250 (limits included),
the sum of m, n and p being between 2 and 250, for example between 2 and 150 or for example between 3 and 100.

According to another example of this embodiment of the present invention, in the formula (I) above:
m and n represent a number being between 1 and 250 (other than 0) and
p is equal to 0, the sum of m and n being between 2 and 250, for example between 2 and 150 for example between 3 and 100.

According to yet another example of this embodiment, in the formula (I) above:
m represents a number varying between 2 and 250, for example between 2 and 150, or for example between 3 and 100, and
n and p are equal to 0.

According to this example of embodiment, said polyalkoxyl chain of the compound of formula (I) consists exclusively of ethoxyl units OE.

The polyurethane of the present invention thus comprises a compound of formula (I), also known as bicycloheptenyl compound, which is optionally substituted.

According to one embodiment of the present invention, the bicycloheptenyl compound, which is optionally polyalkoxylated, of formula (I) is such that R represents a bicyclo[d.e.f]heptenyl radical in which d is 2, 3 or 4, e is 1 or 2 and f is 0 or 1 and the sum d+e+f=5, optionally substituted by one or more identical or different alkyl groups, comprising between 1 and 20 carbon atoms.

According to another embodiment of the present invention, the said bicycloheptenyl compound of formula (I) is such that R represents a bicyclo[3.1.1]heptenyl radical substituted by two $CH_3$ groups.

According to yet another embodiment, the said bicycloheptenyl compound of formula (I):

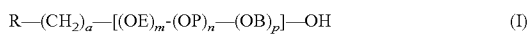

is such that:
a is equal to 2,
m, n and p are equal to 0 and
R represents:

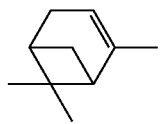

According to this embodiment, the said bicycloheptenyl compound of formula (I) is such that:

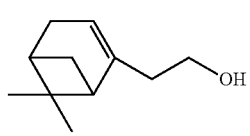

This compound is also known under the name of Nopol or 2-(6,6-dimethylbicyclo[3.1.1]hept-2-en-2-yl)ethanol.

According to one aspect of the invention, the said polyurethane results from the condensation of:
a) from 1% to 29% by weight of at least one compound of formula (I),
b) from 70% to 98% by weight of at least one poly(alkylene glycol) and
c) from 1% to 29% by weight of at least one polyisocyanate,
the sum of these percentages by weight being equal to 100%.

According to another aspect of the invention, the said polyurethane results from the condensation of:
a) from 3% to 10% by weight of at least one compound of formula (I),
b) from 80% to 94% by weight of at least one poly(alkylene glycol) and
c) from 3% to 10% by weight of at least one polyisocyanate,
the sum of these percentages by weight being equal to 100%.

According to one embodiment of the present invention, the polyurethane exhibits a rheological profile of newtonian type, that is to say that it makes it possible to obtain a low viscosity at a low shear gradient (for example, Brookfield viscosity). According to this embodiment, the polyurethane makes it possible to additionally obtain a high viscosity at a high shear gradient (for example, ICI viscosity).

The manufacture of the polyurethanes, which belong to the family of the thickeners of HEUR type, is known to a person skilled in the art, who may refer to the teaching of the documents cited above in the technological background of the present invention.

A subject-matter of the present invention is also a process for the preparation of a polyurethane as described above, the said process consisting of a condensation of its different constituents.

Formulation of the HEUR Thickener

The polyurethane according to the invention can be formulated or coformulated with other constituents or components.

Thus, the present invention also relates to an aqueous formulation comprising a polyurethane according to the invention, as described above.

This aqueous thickening formulation is intended to be incorporated in a final composition, for example a paint, a paper coating colour or a detergent composition.

The polyurethane according to the invention can be coformulated in the presence of water.

According to one embodiment, the said aqueous formulation according to the invention consists of:
1) from 5% to 50% by weight of at least one polyurethane according to the invention, as described above, and
2) from 50% to 95% by weight of water,
the sum of these percentages by weight being equal to 100%.

According to another embodiment, the said aqueous formulation according to the invention consists of:
1) from 5% to 25% by weight of at least one polyurethane according to the invention, as described above, and
2) from 75% to 95% by weight of water,
the sum of these percentages by weight being equal to 100%.

The polyurethane according to the invention can be coformulated in water, in the presence of at least one surface-active agent. This surface-active agent makes it possible to formulate the thickener in the form of a less viscous aqueous liquid solution which can thus be more easily employed by the formulator.

Thus, according to one embodiment of the present invention, the said aqueous formulation comprises a polyurethane, as described above, and also water and at least one surface-active agent.

"Surfactant" or "surface-active agent" is understood to mean a molecule or a polymer consisting of at least a hydrophilic part and of at least a hydrophobic part.

The surface-active agent used in the context of the invention can be different in nature; for example, it can be anionic or non-ionic.

This surfactant can be selected from the categories of ionic surfactants (in this case, preferably an ionic surfactant) and/or non-ionic surfactants and/or mixed surfactants (comprising, in the same molecule, a non-ionic and anionic structure). The preferred surfactant is composed of at least one surfactant selected from the category of non-ionic surfactants, optionally in the presence of an anionic surfactant.

Mention may be made, among the suitable anionic surfactants, of sodium, lithium, potassium, ammonium or magnesium salts derived from alkyl ether sulphates with alkyl(s) varying from $C_6$ to $C_{12}$, in linear, iso, oxo, geminal, cyclic or aromatic configuration, or from $C_{12}$ alkyl sulphates, from alkyl phosphate esters or from dialkyl sulfosuccinates. The anionic surfactants are preferably used with at least one non-ionic surfactant.

Mention may be made, as examples of mixed surfactants, of alkoxylated alkylphenol sulfonates. The non-ionic surfactants can be used alone or in combination with an anionic surfactant. Mention may be made, as preferred examples of suitable non-ionic surfactants, of: ethoxylated (2 to 15 OE) $C_4$-$C_{18}$ alcohols, ethoxylated (2 to 40 OE) $C_4$-$C_{18}$ Guerbet alcohols, ethoxylated (2 to 40 OE) single-branched $C_{10}$-$C_{18}$ alcohols, $C_{18}$ sorbitol esters, ethoxylated (2 to 20 OE units) sorbitol esters, ethoxylated (less than 15 OE) $C_4$-$C_{18}$ acids, ethoxylated (30 to 40 OE) castor oil, ethoxylated (7 to 60 OE) hydrogenated castor oil, esters, such as glycerol palmitate, glycerol stearate, ethylene glycol stearate, diethylene glycol stearate, propylene glycol stearate, polyethylene glycol 200 stearate and ethoxylated (2 to 15 OE) $C_{18}$ esters. The hydrophobic chains can correspond to linear, iso, oxo, cyclic or aromatic structures.

According to one embodiment, the formulation comprises at least one non-ionic surfactant optionally combined with at least one anionic surfactant, at a total content by weight ranging from 0.1 to 40% by weight, for example from 5% to 20% by weight or from 10% to 17% by weight. In this case, the ratio by weight between the two surface active agents can, for example, vary between 25/75 and 75/25.

According to one embodiment of the present invention, the polyurethane of the present invention is formulated in the presence of more than two surface-active agents, for example three or four surface-active agents.

According to one embodiment, the said aqueous formulation according to the invention consists of:
1) from 2% to 50% by weight of at least one polyurethane according to the invention, as described above, preferably from 5% to 30% by weight,
2) from 0.1% to 40% by weight of at least one surface-active agent, preferably from 5% to 30% by weight, and
3) from 10% to 93% by weight of water, preferably from 40% to 85% by weight, the sum of these percentages by weight being equal to 100%.

The polyurethane according to the invention can be formulated in a water-miscible solvent. The main reason for the addition of an organic cosolvent is to lower the viscosity of this polyurethane in the water, in order to facilitate the handling. The polyurethane is, for example, formulated with one or more polar solvents belonging in particular to the group consisting of water, methanol, ethanol, propanol, isopropanol, butanols, acetone, tetrahydrofuran or their mixtures.

Two specific examples of water-miscible organic solvent are:
diethylene glycol monobutyl ether (also known under the name of Butyl Carbitol™) or ethylene or propylene glycol ether, and
butylene glycol ether.

The viscosity of the polyurethane as it is, before it is incorporated in a paint composition, for example, is preferably less than 10 000 mPa·s at 25° C. and at 100 revolutions per minute, so that it is easier to pour from the storage container and more rapidly incorporated in the composition to be thickened at room temperature. The water-miscible solvent chosen from such commercial compositions has, to date, exclusively been an organic solvent.

The polyurethane according to the invention can be coformulated in water, in the presence of a coalescence agent. Equivalently to a solvent, the coalescence agent makes it possible to formulate the thickener in the form of a less viscous aqueous liquid solution which can thus be more easily employed by the formulator.

According to one embodiment, the said aqueous formulation according to the invention consists of:
1) from 5% to 50% by weight of at least one polyurethane according to the invention, as described above,
2) from 5% to 30% by weight of at least one solvent and/or coalescence agent and
3) from 20% to 75% by weight of water, the sum of these percentages by weight being equal to 100%.

According to one aspect of the invention, the aqueous formulation additionally comprises at least one additive selected from the group consisting of a biocide, a solvent, an antifoaming agent, a pH regulator, a coalescence agent, an encapsulating agent and their mixtures.

"Biocide" is understood to mean a chemical substance intended to destroy, repel or render inoffensive harmful organisms, to prevent the action thereof or to combat them in any other way, by chemical or biological action.

"Antifoaming agent" is understood to mean a substance or a formulation intended to destroy air bubbles within a homogeneous or heterogeneous liquid medium (or at its surface) or to prevent their formation.

"pH regulator" or "pH-regulating agent" is understood to mean a chemical compound which makes it possible to adjust the pH to the expected value. For example, the pH-regulating agent can increase the pH; this is the case with bases, such as NaOH. Alternatively, the pH-regulating agent can decrease the pH; this is the case with acids.

"Coalescence agent" is understood to mean an agent used in paints which makes it possible to lower the paint minimum film formation temperature (MFFT) to a temperature suited to the application conditions desired (for example an MFFT of 5° C. for an external application). Mention may be made, as examples of coalescence agents according to the invention, of propylene glycol, butyl glycol, 2,2,4-trimethyl-1,3-pentanediol monoisobutyrate or 2,2,4-trimethyl-1,3-pentanediol diisobutyrate, 2,2,4-trimethyl-1,3-pentanediol monoisobutyrate, glycol or ether derivatives of Dowanol® type.

"Encapsulating agent" is understood to mean an agent which creates a hydrophobic environment, for example a solvation cage. Mention may in particular be made, as encapsulating agent, of cyclodextrin.

According to one embodiment, the said aqueous formulation according to the invention consists of:
1) from 2% to 50% by weight of at least one polyurethane according to the invention, as described above, preferably from 2% to 30% by weight,
2) from 0.1% to 40% by weight of at least one surface-active agent, preferably from 5% to 30% by weight,
3) from 10% to 93% by weight of water, preferably from 40% to 85% by weight, and
4) from 0% to 5% by weight of at least one other additive chosen from the group consisting of a biocide, a solvent, an antifoaming agent, a pH regulator, a coalescence agent, an encapsulating agent and their mixtures, preferably from 0.5% to 4% by weight,
the sum of these percentages by weight being equal to 100%.

Final Aqueous Composition

A subject-matter of the present invention is an aqueous composition comprising a polyurethane according to the invention or an aqueous thickening formulation according to the invention, the said final aqueous composition being selected from the group consisting of a paint, a putty, a render coating, a thick covering, a waterproof covering, a lacquer, a varnish, an ink, a mineral suspension (slurry), a paper coating colour, a cosmetic formulation and a detergent formulation.

The said composition is thickened using a polyurethane or an aqueous thickening formulation according to the invention.

Furthermore, the present invention also relates to the use of a polyurethane according to the invention or of an aqueous thickening composition according to the invention for thickening an aqueous composition, the said aqueous composition being selected from the group consisting of a lacquer, a varnish, a paint, a putty, a render coating, a thick covering, a waterproof covering, an ink, a mineral suspension (slurry), a paper coating colour, a cosmetic formulation and a detergent formulation.

According to one embodiment, the aqueous composition to be thickened is of the following types: gloss paint, semi-gloss paint, satin paint, or all other paints having a low pigment volume concentration (PVC).

The "pigment volume concentration" is defined by the following formula:

$$PVC\ (\%) = 100 \times V_f / (V_f + V_b)$$

with $V_f$ which represents the volume of the mineral fillers and $V_b$ which represents the volume of binders in the paint formulation.

According to another embodiment, the aqueous composition to be thickened is of the following type: paint comprising a medium or high pigment volume concentration (PVC), varying between eggshell paint and matt paint. In this case, the polyurethane thickener of the present invention can be combined with another thickener exhibiting a pseudoplastic profile.

According to one aspect of the present invention, the aqueous composition comprises from 0.02% to 5% by weight of active material of the said thickener.

According to another aspect of the present invention, the aqueous formulation comprises from 0.05% to 2% by weight of active material of the said thickener.

"Weight of active material" is understood to mean the dry weight of polyurethane according to the invention, independently of the coformulation ingredients.

According to yet another aspect of the present invention, the aqueous formulation comprises at least one mineral filler selected from the group consisting of calcium carbonate, kaolin, talc and silicate and/or at least one pigment selected from the group consisting of titanium dioxide, iron oxide and zinc.

According to one aspect of the invention, the aqueous formulation is a paint and comprises at least one dispersing agent, at least one mineral pigment or filler, at least one binder, at least one biocide, at least one antifoaming agent and optionally one surface-active agent, a surface agent and/or a coalescence agent, a solvent.

The examples which follow make possible a better understanding of the present invention, without limiting the scope thereof.

EXAMPLE

The viscosity of the test formulations or of the paint formulations is determined at different rate gradients:
- at a low rate gradient, the Brookfield viscosity, which is measured using a RVT-type Brookfield viscometer, in the unstirred flask, at a temperature of 25° C. and at two rotational speeds of 10 and 100 revolutions per minute with the appropriate spindle. Reading is carried out after rotating for one minute. Two Brookfield viscosity measurements, respectively denoted $\mu_{BK10}$ and $\mu_{BK100}$ (mPa·s), are thus obtained,
- at a moderate rate gradient, the Stormer viscosity, denoted $\mu_S$ (Krebs units), and
- at a high rate gradient: the Cone Plan viscosity or ICI viscosity, denoted $\mu_I$ (mPa·s).

Example 1

This example illustrates the use of a thickener according to the invention in a solvent-free aqueous satin paint formulation, the composition of which is given in Table 1 below. It illustrates the thickening power of a polyurethane according to the invention (test 1-4), employing a compound of formula (1). At the same time, this example also illustrates polyurethanes outside the invention (Tests 1-1 to 1-3).

Text 1-1 (Outside the Invention)
The said polyurethane results from the condensation of, expressed as % by weight with respect to the total weight of the polyurethane:
 2.7% by weight of a linear $C_8$ alcohol,
 92.8% by weight of PEG 10 000 and
 4.5% by weight of isophorone diisocyanate (IPDI).

Test 1-2 (Outside the Invention)
The said polyurethane results from the condensation of, expressed as % by weight with respect to the total weight of the polyurethane:
 4.6% by weight of a linear $C_{11}$ alcohol,
 89.4% by weight of PEG 10 000 and
 6.0% by weight of isophorone diisocyanate (IPDI).

Test 1-3 (Outside the Invention)
The said polyurethane results from the condensation of, expressed as % by weight with respect to the total weight of the polyurethane:
 4.2% by weight of an isoborneol compound (a cyclic compound without unsaturation and without a spacer arm),
 89.8% by weight of PEG 10 000 and
 6.0% by weight of isophorone diisocyanate (IPDI).

Test 1-4 (According to the Invention)
The said polyurethane results from the condensation of, expressed as % by weight with respect to the total weight of the polyurethane:
 4.5% by weight of a bicycloheptene compound of formula:

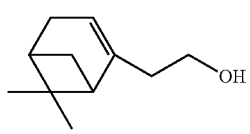

(Nopol or 2-(6,6-dimethylbicyclo[3.1.1]hept-2-en-2-yl)ethanol),
 89.5% by weight of PEG 10 000 and
 6.0% by weight of isophorone diisocyanate (IPDI).

The four polyurethanes are formulated in water in the presence of a surfactant which is a $C_8$-$C_{10}$ fraction of an alkoxylated fatty alcohol (Simulsol® OX1008). The PU/surfactant/water ratios are 20/5/75. As the paint composition comprises 44 g of polyurethane for a total weight of 1000 g of paint (see Table 1), the dose of thickener in the final composition is 0.88% of active agent (or of active ingredient) by weight, taking into account the formulation of the thickeners tested (surfactants and water).

All the results have been combined in Table 2 below.

For each of the tests, the $\mu_{BK10}$, $\mu_{BK100}$, $\mu_I$ (in mPa·s) and $\mu_S$ (in Krebs units, KU, measured with the standard module) viscosities were determined according to the methods described above at T=0 and at T=24 h at room temperature.

TABLE 1

| Constituent of the paint | Weight (g) |
|---|---|
| Water | 191 |
| Dispersant (Coadis ® BR3) | 6 |
| Biocide (Acticide ® MBS) | 2 |
| Antifoaming agent (Airex ® 901W) | 2 |
| TiO$_2$ (RHD2) | 188 |
| CaCO$_3$ (Omyacoat ® 850OG) | 130 |
| Binder (Acronal 290D) | 416 |
| Monopropylene glycol | 10 |
| Texanol | 10 |
| Antifoaming agent (Tego ® 825) | 1 |
| PU thickener (according to the tests) | 44 |

TABLE 2

| | | Results | | | |
|---|---|---|---|---|---|
| | | Test 1-1 OInv | Test 1-2 OInv | Test 1-3 OInv | Test 1-4 Inv |
| T = 0 | $\mu_{Bk10}$ | 2 040 | 13 500 | 1 000 | 2 600 |
| | $\mu_{Bk100}$ | 1 108 | 7 390 | 514 | 1 428 |
| | $\mu_S$ | 83 | 141 | 66 | 89 |
| | $\mu_I$ | 2.3 | 3.5 | 1.5 | 3.0 |
| T = 24 h | $\mu_{Bk10}$ | 2 320 | 18 000 | 1 040 | 3 080 |
| | $\mu_{Bk100}$ | 1 324 | 11 080 | 589 | 1 816 |
| | $\mu_S$ | 88 | 142 | 70 | 97 |
| | $\mu_I$ | 2.4 | 3.5 | 1.5 | 3.1 |

OInv: Outside the Invention
Inv: According to the Invention

A significantly improved thickening at a high rate gradient ($\mu_I$) is observed in the paint formulation according to Test 1-4 (according to the invention), in comparison with that of Test 1-1 and of Test 1-3 (outside the invention).

The polyurethane of Test 1-2 generates a high ICI viscosity but it is coupled to excessively high viscosities at low and at medium rate gradients. The profile of this polyurethane is not sufficiently newtonian.

The polyurethane according to the present invention exhibits a rheological profile of newtonian type: high viscosity at a high shear gradient and low viscosity at a low shear gradient.

Example 2

This example illustrates the use of a thickener outside the invention, of HASE type, in a solvent-free aqueous satin paint formulation, the composition of which is the same as that of Example 1 above.

Test 2-1 (Outside the Invention)

This test employs a HASE acrylic thickener consisting of, expressed as % by weight with respect to the total weight of the compound:
- 37.9% by weight of methacrylic acid;
- 54.8% by weight of ethyl acrylate; and
- 7.3% by weight of a monomer which is an ethoxylated methacrylate which comprises, at the chain end, a bicycloheptene compound of Nopol or 2-(6,6-dimethylbicyclo[3.1.1]hept-2-en-2-yl)ethanol type, it being possible for the formula of this monomer to be represented in the following way:

TABLE 3

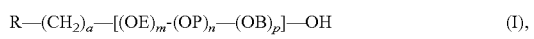

| Results | | |
|---|---|---|
| | | Test 2-1<br>Dose: 0.17% of<br>active agent<br>OInv |
| T = 0 | $\mu_{Bk10}$ | 13 800 |
| | $\mu_{Bk100}$ | 3 250 |
| | $\mu_S$ | 104 |
| | $\mu_I$ | 0.4 |
| T = 24 h | $\mu_{Bk10}$ | 33 400 |
| | $\mu_{Bk100}$ | 5 740 |
| | $\mu_S$ | 119 |
| | $\mu_I$ | 0.4 |

The HASE thickener according to this test exhibits a rheological profile of pseudoplastic type: high viscosity at a low shear gradient. It does not correspond to the subject-matter of the present invention, that is to say to thus confer, on the aqueous composition which contains it, a good dynamic behaviour, that is to say a high viscosity at a high shear gradient.

The invention claimed is:

1. An aqueous composition, comprising a polyurethane thickening agent resulting from the condensation:
   a) of at least one bicycloheptenyl compound, which is optionally polyalkoxylated, of formula (I):

$$R\text{---}(CH_2)_a\text{---}[(OE)_m\text{-}(OP)_n\text{---}(OB)_p]\text{---}OH \qquad (I),$$

in which
   R represents a bicycloheptyl or bicycloheptenyl radical, optionally substituted by one or more identical or different alkyl groups, comprising between 1 and 20 carbon atoms,
   a is equal to 0, 1 or 2,
   $[(OE)_m\text{-}(OP)_n\text{---}(OB)_p]$ represents a polyalkoxyl chain comprising alkoxyl units, distributed in blocks, alternating or random, chosen from ethoxyl OE units, propoxyl OP units and butoxyl OB units, and
   m, n and p represent, independently of one another, 0 or a number varying between 1 and 250 (limits included), the sum of m, n and p being between 0 and 250;
   b) of at least one polyol, for example at least one poly(alkylene glycol); and
   c) of at least one polyisocyanate.

2. The aqueous composition according to claim 1, wherein the bicycloheptenyl compound, which is optionally polyalkoxylated, of formula (I) of the polyurethane thickening agent is such that R represents a bicyclo[d.e.f]heptenyl radical in which d is 2, 3 or 4, e is 1 or 2 and f is 0 or 1 and the sum d+e+f=5, optionally substituted by one or more identical or different alkyl groups, comprising between 1 and 20 carbon atoms.

3. The aqueous composition according to claim 1, wherein the bicycloheptenyl compound, of formula (I), of the polyurethane thickening agent is such that:
   a is equal to 2,
   m, n and p are equal to 0, and
   R represents:

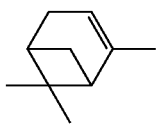

4. The aqueous composition according to claim 1, wherein the polyurethane thickening agent results from the condensation of:
   a) from 1% to 29% by weight of at least one compound of formula (I),
   b) from 70% to 98% by weight of at least one poly(alkylene glycol), and
   c) from 1% to 29% by weight of at least one polyisocyanate,
   the sum of these percentages by weight being equal to 100%.

5. The aqueous composition according to claim 1, wherein the poly(alkylene glycol) of the polyurethane thickening agent is a poly(ethylene glycol), the molecular weight of which varies between 2000 g/mol and 20 000 g/mol.

6. The aqueous composition according to claim 1, wherein the polyurethane thickening agent is in the form of an aqueous formulation additionally comprising water and at least one surface-active agent.

7. The aqueous composition according to claim 6, further comprising at least one additive selected from the group consisting of a biocide, a solvent, an antifoaming agent, a pH regulator, a coalescence agent, an encapsulating agent, and mixtures thereof.

8. The aqueous composition according to claim 6, comprising:
   1) from 2% to 50% by weight of at least one of the polyurethane thickening agent,
   2) from 0.1% to 40% by weight of at least one surfactant,
   3) from 10% to 93% by weight of water, and
   4) from 0% to 5% by weight of at least one other additive selected from the group consisting of a biocide, a solvent, an antifoaming agent, a pH regulator, a coalescence agent, an encapsulating agent and their mixtures,
   the sum of these percentages by weight being equal to 100%.

9. The aqueous composition according to claim 1, in a form selected from the group consisting of a paint, a putty, a render coating, a thick covering, a waterproof covering, a lacquer, a varnish, an ink, a mineral suspension (slurry), a paper coating colour, a cosmetic formulation and a detergent formulation.

10. A method for thickening an aqueous composition, the method comprising contacting the aqueous composition with a polyurethane resulting from the condensation:

a) of at least one bicycloheptenyl compound, which is optionally polyalkoxylated, of formula (I):

$$R-(CH_2)_n-[(OE)_m-(OP)_n-(OB)_p]-OH \qquad (I),$$

in which:
- R represents a bicycloheptyl or bicycloheptenyl radical, optionally substituted by one or more identical or different alkyl groups, comprising between 1 and 20 carbon atoms,
- a is equal to 0, 1 or 2,
- $[(OE)_m-(OP)_n-(OB)_p]$ represents a polyalkoxyl chain comprising alkoxyl units, distributed in blocks, alternating or random, chosen from ethoxyl OE units, propoxyl OP units and butoxyl OB units, and
- m, n and p represent, independently of one another, 0 or a number varying between 1 and 250 (limits included), the sum of m, n and p being between 0 and 250;

b) of at least one polyol, for example of at least one poly(alkylene glycol); and c) of at least one polyisocyanate, wherein:

the polyurethane is optionally present in the form of an aqueous formulation with water and at least one surface-active agent; and the aqueous composition is selected from the group consisting of a paint, a putty, a render coating, a thick covering, a waterproof covering, a lacquer, a varnish, an ink, a mineral suspension (slurry), a paper coating colour, a cosmetic formulation and a detergent formulation.

* * * * *